United States Patent
Liu et al.

(10) Patent No.: US 10,289,911 B2
(45) Date of Patent: May 14, 2019

(54) ENTRANCE DETECTION FROM STREET-LEVEL IMAGERY

(71) Applicant: Uber Technologies, Inc., San Francisco, CA (US)

(72) Inventors: Jingchen Liu, State College, PA (US); Vasudev Parameswaran, Fremont, CA (US); Thommen Korah, San Ramon, CA (US); Varsha Hedau, San Jose, CA (US); Radek Grzeszczuk, Menlo Park, CA (US); Yanxi Liu, Mountain View, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/790,571

(22) Filed: Oct. 23, 2017

(65) Prior Publication Data

US 2018/0060664 A1 Mar. 1, 2018

Related U.S. Application Data

(63) Continuation of application No. 15/373,354, filed on Dec. 8, 2016, now Pat. No. 9,798,931, which is a
(Continued)

(51) Int. Cl.
*G06K 9/00* (2006.01)
*G06K 9/46* (2006.01)
(Continued)

(52) U.S. Cl.
CPC ........... *G06K 9/00697* (2013.01); *G06K 9/46* (2013.01); *G06K 9/4604* (2013.01);
(Continued)

(58) Field of Classification Search
CPC ............ G06K 9/00697; G06K 9/4604; G06K 9/4652; G06K 9/6277
See application file for complete search history.

(56) References Cited

U.S. PATENT DOCUMENTS

| 6,363,161 B2 | 3/2002 | Laumeyer et al. |
| 8,494,285 B2 | 7/2013 | Zhang et al. |
| (Continued) | | |

FOREIGN PATENT DOCUMENTS

| CN | 102779267 A | 11/2012 |
| WO | WO 2013/170362 A1 | 11/2013 |

OTHER PUBLICATIONS

Kim et al, "Entrance Detection of Building Component Based on Multiple Cues," ICIC 2010, CCIS 93, pp. 395-406 (Year: 2010).*
(Continued)

*Primary Examiner* — David F Dunphy
(74) *Attorney, Agent, or Firm* — Fenwick & West LLP

(57) ABSTRACT

Architecture that detects entrances on building facades. In a first stage, scene geometry is exploited and the multi-dimensional problem is reduced down to a one-dimensional (1D) problem. Entrance hypotheses are generated by considering pairs of locations along lines exhibiting strong gradients in the transverse direction. In a second stage, a rich set of discriminative image features for entrances is explored according to constructed designs, specifically focusing on properties such as symmetry and color consistency, for example. Classifiers (e.g., random forest) are utilized to perform automatic feature selection and entrance classification. In another stage, a joint model is formulated in three dimensions (3D) for entrances on a given facade, which enables the exploitation of physical constraints between different entrances on the same facade in a systematic
(Continued)

manner to prune false positives, and thereby select an optimum set of entrances on a given facade.

20 Claims, 6 Drawing Sheets

Related U.S. Application Data continuation of application No. PCT/US2015/033858, filed on Jun. 3, 2015, which is a continuation of application No. 14/298,932, filed on Jun. 8, 2014, now Pat. No. 9,235,775.

(51) Int. Cl.
G06K 9/62 (2006.01)
G06T 7/90 (2017.01)

(52) U.S. Cl.
CPC ......... *G06K 9/4652* (2013.01); *G06K 9/6267* (2013.01); *G06K 9/6277* (2013.01); *G06T 7/90* (2017.01); *G06K 2009/4666* (2013.01)

(56) References Cited

U.S. PATENT DOCUMENTS

| 2010/0214291 | A1 | 8/2010 | Muller et al. |
| 2012/0170805 | A1 | 7/2012 | Brown et al. |
| 2012/0224770 | A1 | 9/2012 | Strassenburg-Kleciak |
| 2013/0101175 | A1* | 4/2013 | Lynch ...................... G01C 3/00 382/106 |
| 2015/0324998 | A1* | 11/2015 | Song ........................ G06T 3/40 382/171 |

OTHER PUBLICATIONS

Zhao et al, "Boundary extraction using supervised edgelet classification", 2012, Optical Engineering 51(1), 017002, 8 pages (Year: 2012).*

Jiu, et al., Integrating spatial layout of object parts into classification without pairwise terms: application to fast body parts estimation from depth images, In Proceedings of the International Conference on Computer Vision Theory and Applications, vol. 1, Feb. 21, 2013, 10 pages.

Kang, et al., "Building Component Detection by Using Context Information and Multiple Cues for Outdoor Robot", in Proceedings of ICCAS-SICE International Joint Conference, Aug. 18, 2009, pp. 165-170.

Kang, S-J. et al., "Entrance Detection of Buildings Using Multiple Cues," Intelligent Information and Database Systems, ACIIDS 2010, Part I, LNAI 5990, Mar. 24, 2010, pp. 251-260.

Kim et al, "Entrance Detection of Building Component Based on Multiple Cues," 2010, ICIC 2010, CCIS 93, pp. 395-406.

Kim, et al., "Object Recognition using Segmented Region and Multiple Features on Outdoor Environments", In Proceedings of the 1st International Forum on Strategic Technology, Oct. 18, 2006, pp. 305-308.

Korah, T. et al, "Analysis of Building Textures for Reconstructing Partially Occluded Facades," Computer Vision—ECCV 2008; Lecture Notes in Computer Science 5302, Oct. 12, 2008, pp. 359-372.

Liu, F. et al., "Detection of Facade Regions in Street View Images from Split-and-Merge of Perspective Patches," Journal of Image and Graphics, Jun. 2014, pp. 8-14, vol. 2.

Mayer, Helmut, Automatic Object Extraction from Aerial Imagery—A Survey Focusing on Buildings, In Journal of Computer Vision and Image Understanding, vol. 74, No. 2, May 1999, pp. 138-149.

Murillo et al, "Visual door detection integrating appearance and shape cues," 2008, Robotics and Autonomous Systems 56.6 (2008), 22 pages.

PCT International Search Report and Written Opinion, PCT Application No. PCT/US2015/033858, dated Oct. 21, 2015, 8 pages.

Schindler et al, "A Model-Based Method for Building Reconstruction," 2003, Higher-Level Knowledge in 3D Modeling and Motion Analysis, 2003. HLK 2003. First IEEE International Workshop on. IEEE, 9 pages.

Stoeter, et al., Real-Time Door Detection in Cluttered Environments, In Proceedings of the 15th IEEE International Symposium on Intelligent Control, Jul. 17, 2000, pp. 187-192.

Trinh, et al., "Urban Building Detection by Visual and Geometrical Features", In Proceedings of International Conference on Control, Automation and Systems, Oct. 17, 2007, 6 pages.

Venkateswar, et al., A Framework for Interpretation of Aerial Images, In Proceedings of 10th International Conference on Pattern Recognition, vol. i, Jun. 16, 1990, pp. 204-206.

Wendel, A. et al., "Unsupervised Facade Segmentation Using Repetitive Patterns," Pattern Recognition, DAGM, LNCS 6376, Sep. 22, 2010, pp. 51-60.

United States Office Action, U.S. Appl. No. 15/373,354, dated Jan. 23, 2017, 9 pages.

* cited by examiner

ENTRANCE DETECTION FROM STREET-LEVEL IMAGERY

CROSS REFERENCE TO RELATED APPLICATIONS

This application is a continuation of U.S. application Ser. No. 15/373,354, filed Dec. 8, 2016, which is a continuation of PCT App. No. PCT/US2015/033858, filed Jun. 3, 2015, which claims benefit to U.S. application Ser. No. 14/298,932, filed Jun. 8, 2014, all of which are hereby incorporated by reference in their entirety.

BACKGROUND

Urban scene understanding is an active area of research. Devoid of any context, entrance detection in outdoor scenes is extremely challenging. Scene clutter is a problem because entrances typically make up only a small portion of the image of a building facade. Most entrances have doors whereas some do not. Moreover, there is a wide variety of sizes and appearances of doors. Arches over doors, steps leading up to doors, transparent doors, reflective doors, doors with large handles, partially open doors, shuttered doors etc., lead to large intra-class variation. Additionally, the camera view, occlusions due to trees, vehicles, people, and other objects in the scene further complicate the entrance detection task.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture detects entrances on building facades, which is desirable within urban scene understanding. The architecture can be realized as a multistage system. In a first stage, scene geometry is exploited and the multi-dimensional problem is reduced down to a one-dimensional (1D) problem. Entrance hypotheses are generated by considering pairs of locations along lines exhibiting strong gradients in the transverse direction. In a second stage, a rich set of discriminative image features for entrances is explored according to constructed designs, specifically focusing on properties such as symmetry and color consistency, for example. Classifiers (e.g., random forest) are utilized to perform automatic feature selection and entrance classification. In another stage, a joint model is formulated in three dimensions (3D) for entrances on a given facade, which enables the exploitation of physical constraints between different entrances on the same facade in a systematic manner to prune false positives, and thereby select an optimum set of entrances on a given facade.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
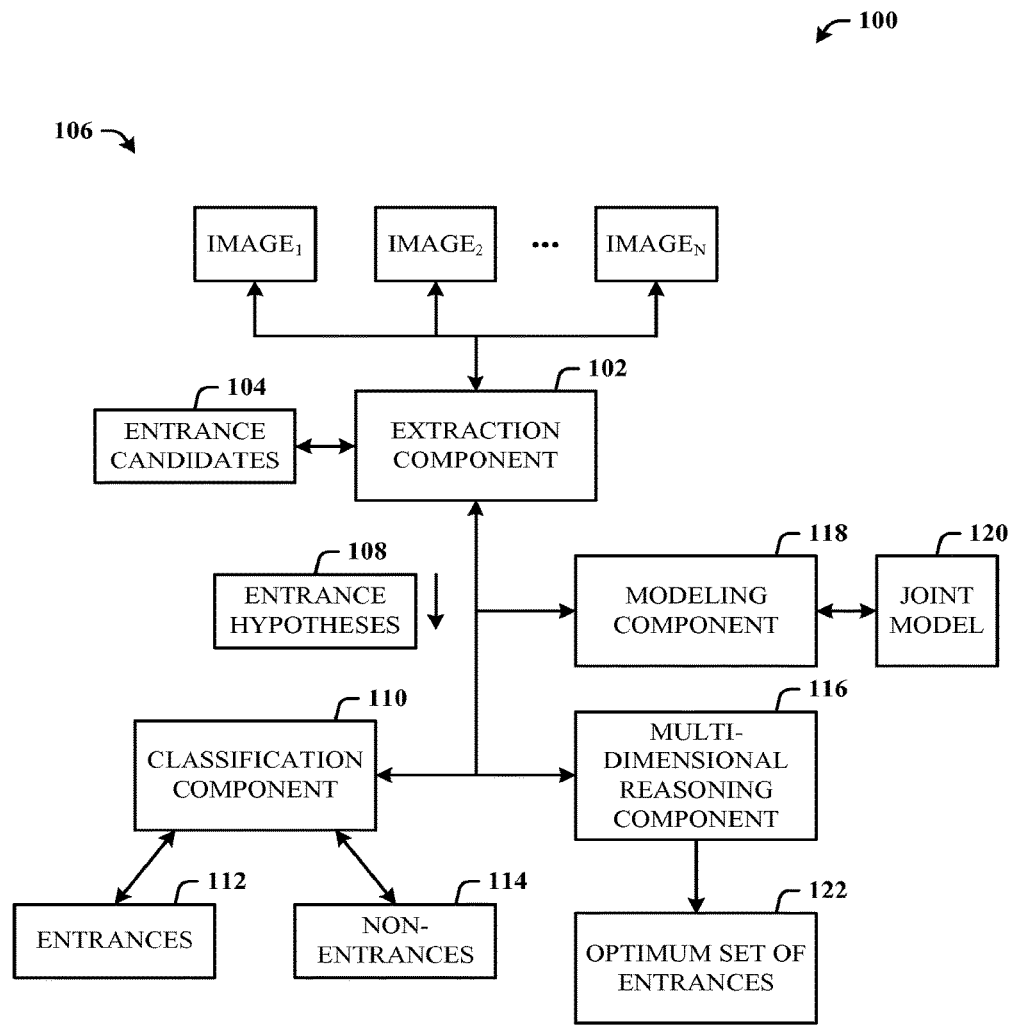
FIG. 1 illustrates a system in accordance with the disclosed architecture.

The disclosed architecture detects building entrances in outdoor scenes, which is a desirable component for urban scene understanding. While entrance detection in indoor scenes has received a lot of attention, tackling the problem in outdoor scenes is considerably more complicated and remains largely unexplored. The wide variety of door appearances and geometries, background clutter, occlusions, specularity, and other difficult lighting conditions together impose many difficult challenges.

The architecture can be realized as a multistage system. In a first stage, scene geometry is exploited and the multi-dimensional problem is reduced down to a one-dimensional (1D) problem. Entrance hypotheses are generated by considering pairs of locations along lines exhibiting strong gradients in the transverse direction. In a second stage, a rich set of discriminative image features for entrances is explored according to constructed designs, specifically focusing on properties such as symmetry and color consistency, for example. Classifiers (e.g., random forest) are utilized to perform automatic feature selection and entrance classification. In another stage, a joint model is formulated in three dimensions (3D) for entrances on a given facade, which enables the exploitation of physical constraints between different entrances on the same facade in a systematic manner to prune false positives, and thereby select an optimum set of entrances on a given facade.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 can include an extraction component 102 configured to extract entrance candidates 104 from images 106 of a facade and generate entrance hypotheses 108 based on the entrance candidates 104. The images can correspond to a street-view of the facade. A classification component 110 can be provided and configured to classify the entrance candidates 104 into different classes to differentiate facade entrances 112 from non-entrances 114 based on the entrance hypotheses 108. A multi-dimensional reasoning component 116 can be provided and configured to project the candidates into multi-dimensional space to resolve conflicts, ultimately enabling the selection of an optimum set of entrances for a given facade.

The extraction component 102 generates the entrance hypotheses 104 based on the processing of pairs of facade locations (e.g., buildings, shops, etc.) along gradient lines in a transverse direction. The classification component 110 employs discriminative image features related to entrances. The features include entrance symmetry and entrance color. The entrance candidates 104 are specified by bounding polygons (e.g., rectangles, circles, arcs, etc.) where polygon line segmentation for a bounding rectangular box, for example, is determined using vertical and horizontal edge detection.

The classification component 110 processes entrance candidates 104 from different images independently, and the multi-dimensional reasoning component 116 resolves conflicts between different views of the entrance candidates 104 using joint reasoning in 3D (three-dimensional) space. The classification component 110 classifies the candidate entrances 104 based on ground truth matching and an entrance or non-entrance label.

The system 100 can further comprise a modeling component 118 configured to formulate a joint model 120 for entrances on a given facade. The joint model 120 enables the utilization of physical constraints between different entrances of a same facade to derive an optimum set of entrances 122 for the given facade.

It is to be understood that in the disclosed architecture, certain components may be rearranged, combined, omitted, and additional components may be included. Additionally, in some embodiments, all or some of the components are present on the client, while in other embodiments some components may reside on a server or are provided by a local or remote service.

Figure 2:
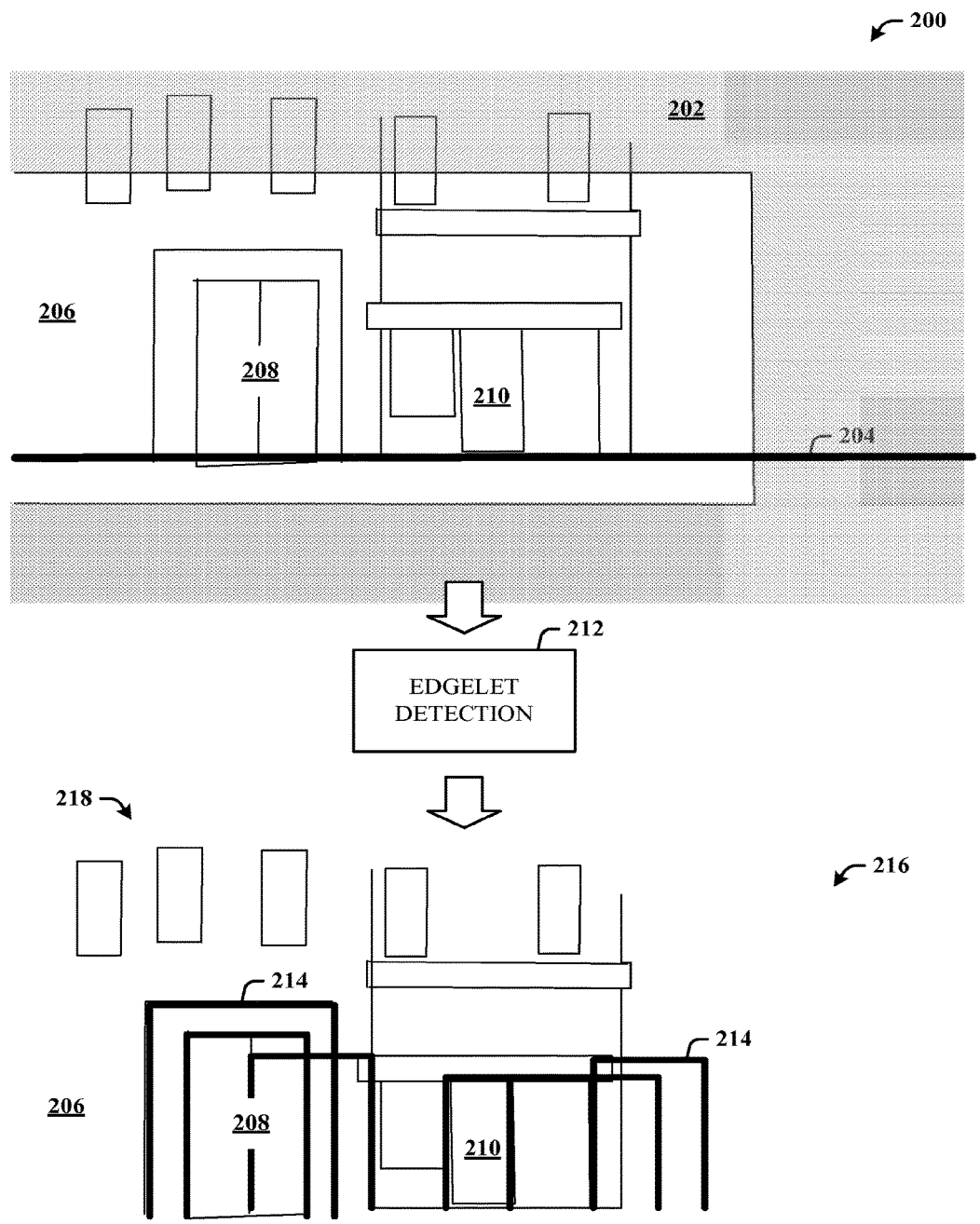
FIG. 2 illustrates an input image having an identified foreground facade mask and ground line.

FIG. 2 illustrates an input image 200 having an identified foreground facade mask 202 and ground line 204. Street-side (street level) images predominantly cover the ground-floor region of the facades and contain various background clutter making it difficult to distinguish among walls, windows, and doors, for example. The image 200 and mask 202 is one of a collection of images and masks that correspond approximately to the first floor of the facade 206 (e.g., a building facade). The foreground masks that approximate the frontal view facades and the ground lines can be estimated via LiDar (a technology that measures distance by illuminating a target with a laser and analyzing the reflected light) data, for example. The mask 202 may also have a label that indicates to which building/facade it corresponds. The images may also be calibrated.

The image 200 shows that facade 206 having a first set of doors 208 and a second door 210 of the same facade 206 but of different businesses. After mask and ground-line computation, edgelet detection 212 (extraction) is performed, which then enables the computation of entrance candidates 214 (in thick bold lined bounding boxes) in a view 216. Upper-level windows 218 and other clutter are no longer considered in the architecture processing.

In a more detailed description, an input to the architecture (e.g., a vision module) is a collection of images and masks corresponding approximately to the first floor of a building. Each mask has a label that indicates to which building the mask corresponds. The images used may be calibrated.

In one implementation, the architecture for entrance detection comprises three stages. First, an entrance candidate extraction stage is executed that generates entrance hypotheses at a high recall and low precision. Second, a classifier designed to separate entrances from other classes of clutter (e.g., windows, etc.) is executed to remove many possible false positives (non-entrances) with negligible loss in recall. Lastly, the results from multiple detections in multiple views are combined exploiting global constraints.

More specifically, entrance candidates (e.g., rectangular image patches) are identified based on edgelet distribution, features extracted, and independent classification performed on each candidate. The entrance-likelihood of all candidates produced by the classifier is then projected back to the 3D real-world space, where conflicts such as overlapping entrances are resolved and final global decisions of entrance locations are made by considering individual candidates jointly.

With respect specifically to candidate extraction, an input to the architecture is street-view images with foreground masks of approximated frontal view facades as well as ground-lines. One or both of these can be estimated via LiDar data.

Entrance candidates can be specified by rectangular bounding boxes and then normalized into the same sized image patch before feature extraction. The left, right, and top boundaries of each bounding box for each candidate are computed and the bottom boundary is selected as the facade ground-line. Although not all entrances are perfect rectangles, most have straight lines on the left and right boundaries, which can then be initially processed to derive potential entrance candidates.

Explicit line segment detection can be slow and sensitive to noise. Thus, assuming the input image contains an approximated frontal view of the facade, a more robust and efficient approach is used to detect vertical edgelets and then accumulate the edgelets vertically. After edge detection (e.g., using Canny edge detection that employs a multi-stage algorithm for edge detection in images), an edge pixel, with both its neighboring pixels above and below being also edge pixels, is accepted as a vertical edgelet. The binary vertical edgelet image $E_v$ can be efficiently calculated via the following pixel-AND operation, $$E_v(x,y)=E(x,y-1)\otimes E(x,y)\otimes E(x,y+1) \quad (1)$$

where $E(x,y)$ represents the binary edge image E, x is the facade base line, y is the vertical coordinate, and $\otimes$ denotes pixel-wise intersection. A similar rule can be applied to horizontal edgelets where the pixel neighborhood is defined left and right rather than above and below.

Peak extraction is performed on the edgelet distributions to extract potential vertical boundaries. One possible approach uses a region-of-dominance method. All local peaks are ranked according to their associated region of dominance, and then the top peaks per image (e.g., twenty-five) selected as potential vertical boundaries.

To propose an entrance candidate, first, a pair of two nearby vertical boundaries is selected, horizontal edgelets between the chosen pair of vertical boundaries are accumulated to obtain a horizontal edgelet distribution, and the local peaks are extracted as the top boundary. Only candidates with a predefined width-to-height ratio (e.g., 0:2 to 1:2) are accepted.

With respect to entrance classification, the set of entrance candidates extracted usually has a high recall rate, that is, most of the true entrances are covered by the candidates; however, outliers may also exist. Therefore, rich visual content features are extracted from all candidates, and a classifier is trained for deleting candidates (ruling out outliers while keeping the inliers). During the training stage, each candidate $c_i$ is matched to the groundtruth and associated with a binary label $y_i \in \{1,0\}$ indicating a door or non-door candidate. Note that multiple candidates can be matched to the same training example at this stage.

The rectangular bounding box of each candidate aligns with edge histogram peaks, and thus, typically indicates the segmentation between the 'doors' (inside) and its 'door frame' (outside). It has been shown that many discriminative features of entrances lie on the frame. Accordingly, the image patches can be extracted with an increased margin (e.g., a 20% margin) outside of the bounding boxes, and then features are extracted from the patches. One or more image features that can be employed include, but are not limited to, Histogram of Gradient (HoG), Principal Component Analysis (PCA), Reflection Symmetry (Sym), and Color Statistics (CS).

With respect to using the HoG feature, a 128×64 patch size segmented into 16-by-8 cells, can be used, resulting in 15-by-7 blocks and nine histogram bins. PCA can be utilized to learn dominant eigenvector of eigen-doors from the positive candidate patches, followed by extracting the low dimensional reconstruction coefficients for both positive and negative patches for a discriminative training. All possible image patches that represent entrances may be distributed within a much lower dimensional space, compared to the original image space, or the space of 'non-entrance' image patches.

Thus, a low-dimensional reconstruction of the door space is constructed while still considering the distribution of non-entrances for a discriminative training and for improved performance. PCA is typically sensitive to noise, outliers, and occlusions, which occur frequently in street-side images and may not be effective in dealing with a large block of continuously corrupted pixels caused by occlusion (e.g., from trees, poles, cars on the street, etc.). To address occlusions, occlusions are simulated by a predefined set of occlusion masks (e.g., nine). The masks can be applied during the dimensional reduction step.

The top coefficients (e.g., twenty-five) are extracted for each foreground mask. Given a candidate patch under partial occlusion, as long as the occlusion mask masks out most of the occluded region, the corresponding low dimensional reconstructions can be considered as acceptable features.

Reflection symmetry is employed as feature for entrance detection. For an open or transparent entrance (where the indoor contents are visible), the color distribution on the door frames remains consistent with left-right symmetry. The RGB (red-green-blue) image patch is decomposed into HSI (hue, saturation, intensity) channels and the symmetry feature extracted from each channel separately. Given the candidate image patch, a local scanning window can be applied under different scales (e.g., 8-by-8, 16-by-16, and 32-by-32), scanning through the left half of the image, and extracting the local histogram. Additionally, the histogram can also be extracted from the symmetric region on the right side, and then the L2 Euclidean distance between the two histograms computed as the symmetry feature.

Additionally, color statistic features (HSI channels separately) can be extracted by applying a similar scanning window and extracting the local mean and standard deviation of the pixel values.

Some examples of partial feature visualization can be obtained to show a candidate patch, a histogram of edge orientation, low-dimensional recovery from the principal components, local asymmetry score on intensity (I) channel, and local variance on the hue (H) channel. It can be observed that entrances are usually more 'symmetric' than non-entrances, and especially around the left and right boundaries.

A Random Forest visual classifier is then learned from extracted features to produce either binary or soft decision for each candidate patch independently. A Random Forest classifier is a method of classification that operates by constructing decision trees at training time and outputting the class that is the mode of the classes output by individual trees.

With respect to joint facade analysis, entrance candidates from different images and scored independently by the image-based classifier may not form a plausible 3D solution. A 3D facade and its entrances are typically visible in multiple views. Conflicts between different views can be resolved by performing joint reasoning on all detected entrance candidates, in 3D. Analysis in 3D also enables the exploitation of per-facade constraints such as the typical density of entrances on a facade.

Using calibration information, the facade boundaries and the entrance candidates are back-projected to the 3D world. Given a 3D facade, and a set of entrance candidates that fall on that facade $c = \{c_n | n=1, \ldots, N\}$, entrance locations are jointly inferred, and specified as a binary indicator $z = z_n$, in which $z_n \in \{0,1\}$. Let $O = \{o_1, \ldots, o_N\}$ be the set of image observations corresponding to the candidates. According to Bayes rule, $$P(z|O) \propto P(z)P(O|z) \quad (2)$$

where $P(z)$ encodes prior knowledge and preferences such as the entrance density on the facade and non-overlapping constraint, and $P(O|z)$ is the likelihood term of obtaining the observations $O$ given $z$.

For the prior term, the entrance density (the number of entrances per meter) can be modeled as a Gaussian distribution. A strict non-overlapping constraint is applied between 3D entrances into the prior.

$$P(z) = \begin{cases} 0; & \exists\, (i,j) \text{ s.t. } z_i = 1, z_j = 1, D_{ij}^{(h)} < \tau_1 \\ P(z) = \aleph\left(\frac{\|z\|_1}{L} \,\Big|\, \mu, \sigma\right); & \text{otherwise} \end{cases}$$

where $L$ is the total length of the facade; $\mu$ and $\sigma$ are the average and standard deviation, respectively, of the entrance density learned from the data; and, $D_{ij}$ is the horizontal real-world distance between the center of candidate $i$ and $j$, where $\tau_i = 1.5$ (meter).

Making an independence assumption between observations, $$P(O|z) = \Pi_n^N P(o_n|z) \quad (3)$$

where $P(O|z) = s_n t_n$, where $s_n \in \{P_n^{(tp)}, P_n^{(fp)}\}$ is the likelihood of obtaining the classification score $s_n$ on the nth candidate; $P_n^{(tp)}$, $P_n^{(fp)}$ is the probability that the visual classifier makes a true positive, false positive classification, respectively; and, $t_n \in \{1, P_n^{(fn)}\}$ where $P_n^{(fn)}$ is the probability that the visual classifier makes a false positive.

In order to evaluate equation (3) above, a decision needs to be made for each candidate whether it is a true positive, false positive, or false negative given the solution hypothesis $z$, that is, all candidates on the same facade ($\{c_i | i=1, \ldots, N\}$) need to be matched to the set of hypothesized entrances ($\{c_j | z_j = 1\}$). A match is found if $D_{ij}^{(h)} < \tau_0$, in which $\tau_0$ is a threshold indicating strong overlapping. The threshold $\tau_0$ can be set to $\tau_0 = 0.5$ meter $< \tau_1$, for example.

The classifier generates soft detection scores $s_i$ for each candidate indicating the detection confidence; thus, the classification probability can be assigned as, $$P_n^{(tp)} = s_n^\alpha \quad (4)$$

$$P_n^{(fp)} = 1 - s_n^\alpha \quad (5)$$

where $\alpha$ adjusts the relative weighting between false positive and false negative in the final solution. If a candidate is selected by $z_n=1$, but no matching is found from another view where the candidate should also be visible, a miss detection penalty can be applied, with a preset miss-detection probability $P_n^{(fn)} = 0.3$.

Since the combinatorial optimization of, $$z^* = \underset{z}{\operatorname{argmax}} P(z \mid O) \quad (6)$$

is NP-hard (non-deterministic polynomial-time hard), a stochastic optimization approach similar to Markov Chain Monte Carlo (MCMC) can be adopted. The optimal (Maximum-a-Posterior) solution of z is being sought, rather than its posterior distribution. Three types of balanced local moves can be specified: Add an Entrance (AaE), Remove an Entrance (RaE), and Shift an Entrance (SaE). During the AaE move, a new candidate i is selected ($z_i=0 \to z_i=1$) under the non-overlapping constraint in Equation (3). On the other hand, an RaE move randomly eliminates an candidate ($z_i=1 \to z_i=0$).

The SaE move substitutes a candidate locally with another contradictory candidate ($z_i=1$, $z_j=0 \to z_i=0$, $z_j=1 | D_{ij}^{(h)} < \tau_1$). Although SaE move can be also realized via an RaE move followed by an AaE move, such a 2-move combination may be less likely to occur if the first move of RaE significantly reduces the objective function score. A new move $z^* \to z$ is accepted stochastically with the probability, $$\min\left(1, \frac{P(z^* \mid O)}{P(z \mid O)}\right) \quad (7)$$

As a general summary, the entrance detection problem is reduced to a 1D scan. The architecture employs three stages with components for candidate extraction, entrance classification, and 3D fusion. Candidate extraction detects as many candidates as possible necessitating a high recall with low precision. Classification exploits several features characteristic of doors/entrances such as reflection symmetry and color statistics. Fusion exploits and encodes physical constraints such as the typical density of entrances on facades per unit length, non-overlap for doors, etc. The problem can be modeled in a Bayesian sense, and the Markov Chain Monte Carlo algorithm used for estimating the optimum set of doors that together explain a given facade image.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
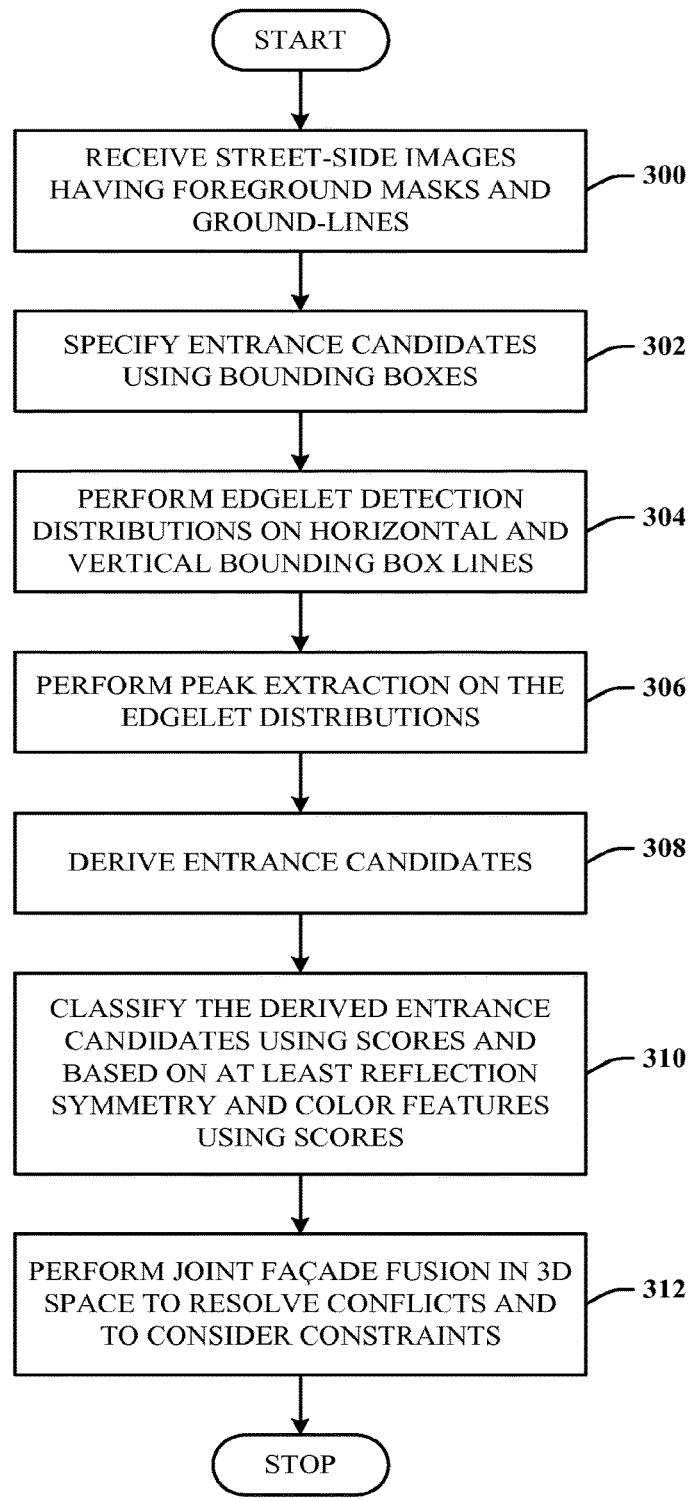
FIG. 3 illustrates a method in accordance with the disclosed architecture.

FIG. 3 illustrates a method in accordance with the disclosed architecture. At 300, street-side (street-level) images are received, each having a foreground mask and a ground-line predetermined. At 302, entrance candidates are specified using bounding boxes (e.g., three-sided). At 304, edgelet detection distributions are performed on horizontal and vertical bounding box lines. At 306, peak extraction is performed on the edgelet distributions. At 308, entrance candidates are derived. At 310, the derived entrance candidates are classified using scores based on at least reflection symmetry and color features. At 312, joint facade fusion is performed in 3D space to resolve conflicts and consider constraints.

Figure 4:
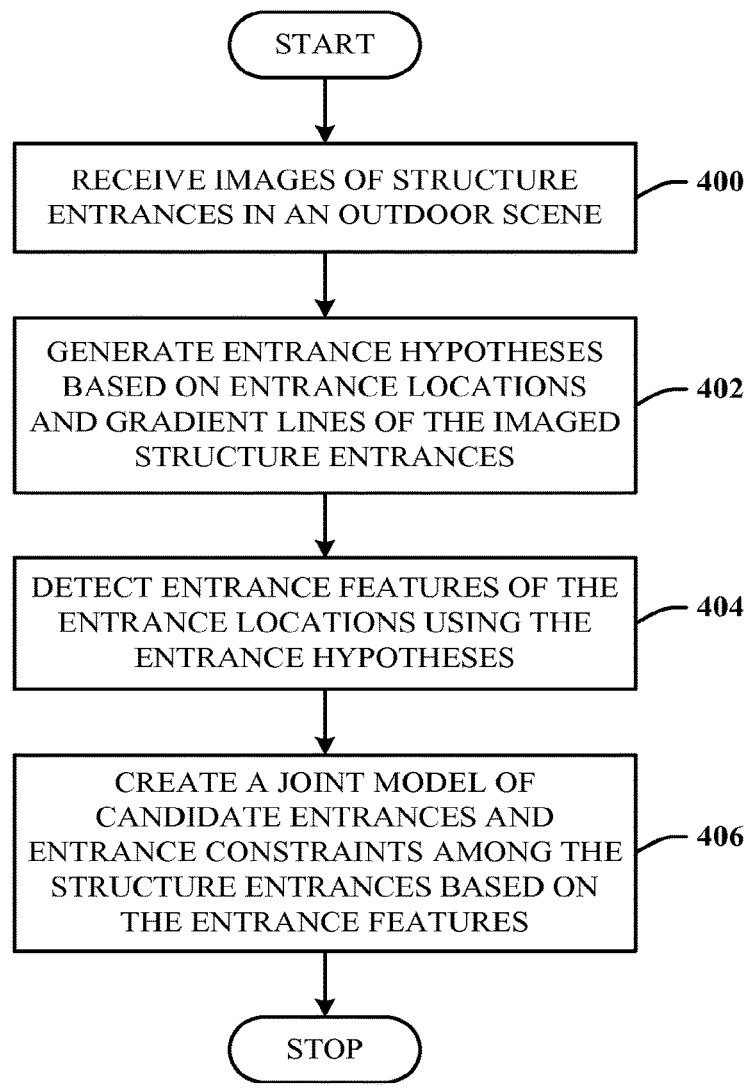
FIG. 4 illustrates an alternative method in accordance with the disclosed architecture.

FIG. 4 illustrates an alternative method in accordance with the disclosed architecture. At 400, images of structure entrances in an outdoor scene are received. At 402, entrance hypotheses are generated based on entrance locations and gradient lines of the imaged structure entrances. At 404, entrance features of the entrance locations are detected using the entrance hypotheses. At 406, a joint model of candidate entrances and entrance constraints among the structure entrances is created based on the entrance features.

The method can further comprise creating the joint model on a per-facade basis. The method can further comprise exploiting constraints between different doors of a same facade. The method can further comprise generating the entrance hypotheses based on edgelet detection and distribution. The method can further comprise projecting an entrance likelihood of all candidate entrances into a three-dimensional space to resolve conflicts. The method can further comprise extracting features of each candidate entrance and each opening and classifying each candidate and each opening. The method can further comprise processing reflection symmetry for entrance detection.

Figure 5:
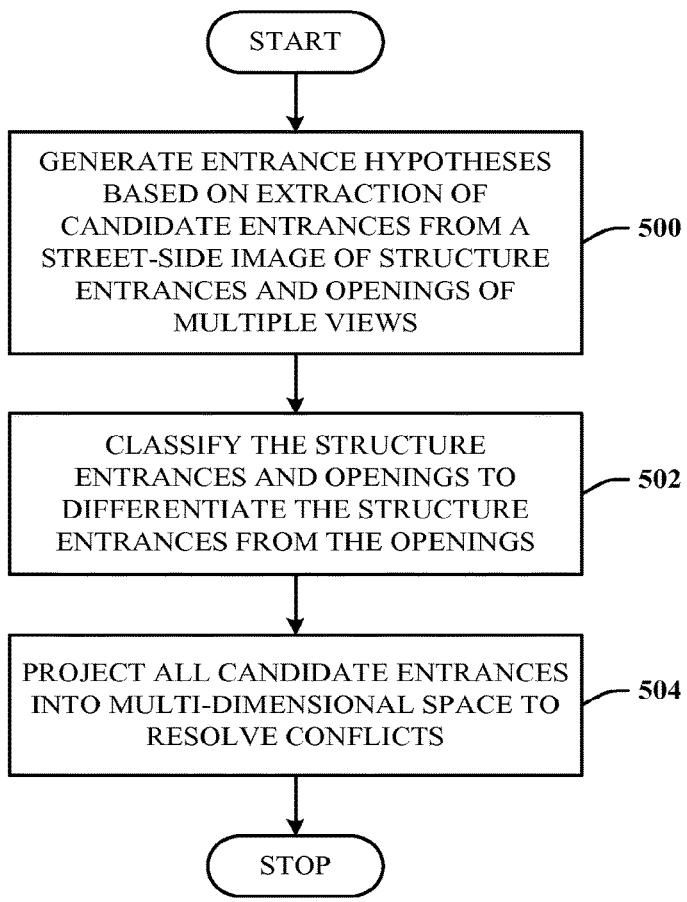
FIG. 5 illustrates yet another alternative method in accordance with the disclosed architecture.

FIG. 5 illustrates yet another alternative method in accordance with the disclosed architecture. The method can be realized in a computer-readable storage medium comprising computer-executable instructions that when executed by a microprocessor, cause the microprocessor to perform the following acts.

At 500, entrance hypotheses are generated based on extraction of candidate entrances from a street-side image of structure entrances and openings of multiple views. At 502, the structure entrances and openings are classified to differentiate the structure entrances from the openings. At 504, all candidate entrances are projected into multi-dimensional space to resolve conflicts.

The method can further comprise generating the entrance hypotheses on a per-facade basis. The method can further comprise exploiting constraints between different doors of a same facade. The method can further comprise generating the entrance hypotheses based on edgelet detection and distribution. The method can further comprise extracting features of each candidate entrance and each opening and classifying each candidate and each opening.

As used in this application, the terms "component" and "system" are intended to refer to a computer-related entity, either hardware, a combination of software and tangible hardware, software, or software in execution. For example, a component can be, but is not limited to, tangible components such as a microprocessor, chip memory, mass storage devices (e.g., optical drives, solid state drives, and/or magnetic storage media drives), and computers, and software components such as a process running on a microprocessor, an object, an executable, a data structure (stored in a volatile or a non-volatile storage medium), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 6:
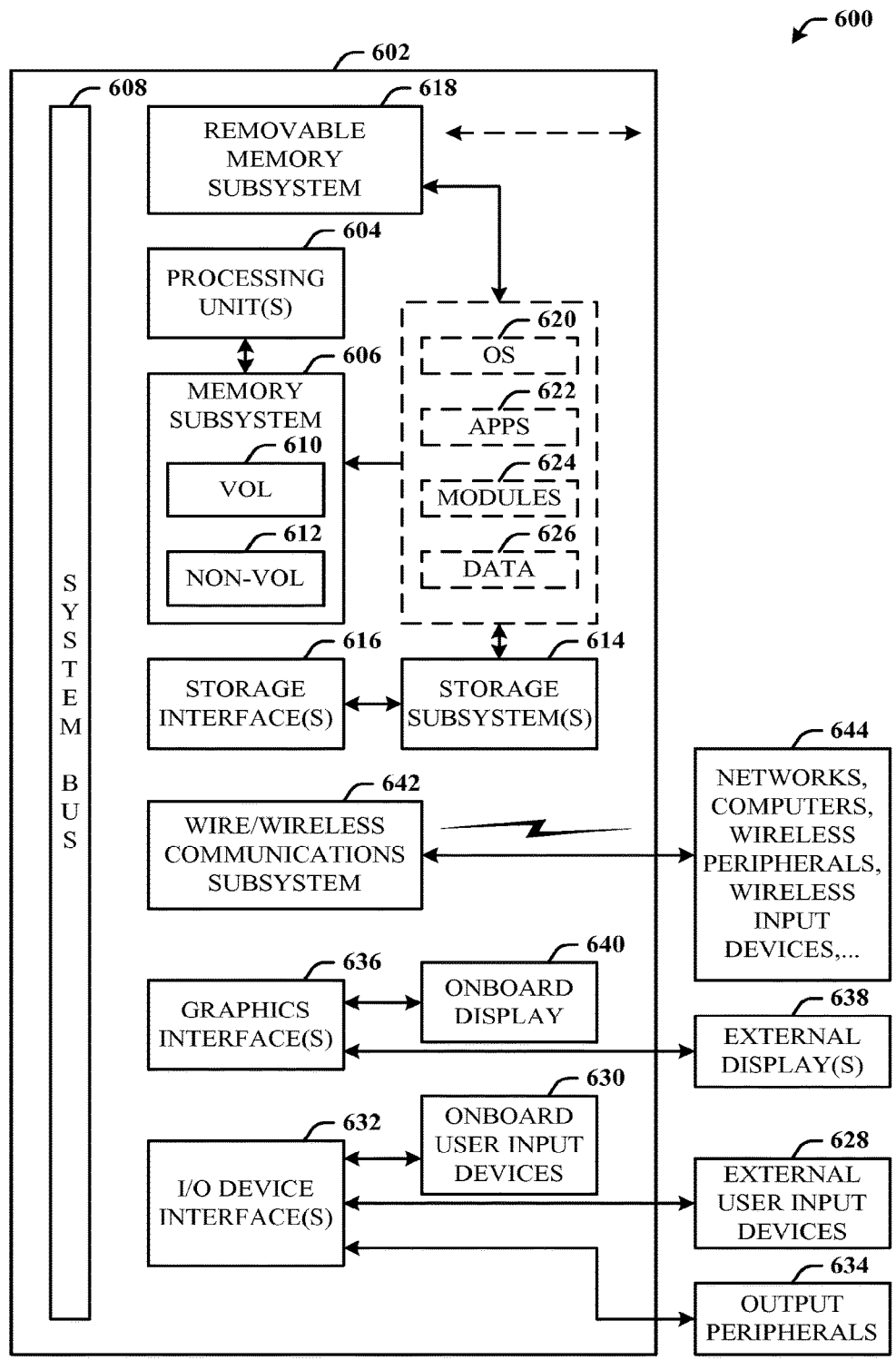
FIG. 6 illustrates a block diagram of a computing system that executes entrance detection from street-side images in accordance with the disclosed architecture.

Referring now to FIG. 6, there is illustrated a block diagram of a computing system 600 that executes entrance detection from street-side images in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 6 and the following description are intended to provide a brief, general description of the suitable computing system 600 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 600 for implementing various aspects includes the computer 602 having microprocessing unit(s) 604 (also referred to as microprocessor(s) and processor(s)), a computer-readable storage medium such as a system memory 606 (computer readable storage medium/media also include magnetic disks, optical disks, solid state drives, external memory systems, and flash memory drives), and a system bus 608. The microprocessing unit(s) 604 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 602 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 606 can include computer-readable storage (physical storage) medium such as a volatile (VOL) memory 610 (e.g., random access memory (RAM)) and a non-volatile memory (NON-VOL) 612 (e.g., ROM, EPROM, EEPROM, etc.). A basic input/output system (BIOS) can be stored in the non-volatile memory 612, and includes the basic routines that facilitate the communication of data and signals between components within the computer 602, such as during startup. The volatile memory 610 can also include a high-speed RAM such as static RAM for caching data.

The system bus 608 provides an interface for system components including, but not limited to, the system memory 606 to the microprocessing unit(s) 604. The system bus 608 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 602 further includes machine readable storage subsystem(s) 614 and storage interface(s) 616 for interfacing the storage subsystem(s) 614 to the system bus 608 and other desired computer components and circuits. The storage subsystem(s) 614 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 616 can include interface technologies such as EIDE, ATA, SATA, and IEEE 1394, for example.

One or more programs and data can be stored in the memory subsystem 606, a machine readable and removable memory subsystem 618 (e.g., flash drive form factor technology), and/or the storage subsystem(s) 614 (e.g., optical, magnetic, solid state), including an operating system 620, one or more application programs 622, other program modules 624, and program data 626.

The operating system 620, one or more application programs 622, other program modules 624, and/or program data 626 can include items and components of the system 100 of FIG. 1, items and components of the image 200 of FIG. 2, and the methods represented by the flowcharts of FIGS. 3-5, for example.

Generally, programs include routines, methods, data structures, other software components, etc., that perform particular tasks, functions, or implement particular abstract data types. All or portions of the operating system 620, applications 622, modules 624, and/or data 626 can also be cached in memory such as the volatile memory 610 and/or non-volatile memory, for example. It is to be appreciated that the disclosed architecture can be implemented with various commercially available operating systems or combinations of operating systems (e.g., as virtual machines).

The storage subsystem(s) 614 and memory subsystems (606 and 618) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 602, and include volatile and non-volatile internal and/or external media that is removable and/or non-removable. For the computer 602, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 602, programs, and data using external user input devices 628 such as a keyboard and a mouse, as well as by voice commands facilitated by speech recognition. Other external user input devices 628 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 602, programs, and data using onboard user input devices 630 such a touchpad, microphone, keyboard, etc., where the computer 602 is a portable computer, for example.

These and other input devices are connected to the microprocessing unit(s) 604 through input/output (I/O) device interface(s) 632 via the system bus 608, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 632 also facilitate the use of output peripherals 634 such as printers, audio devices, camera devices, and so on, such as a sound card and/or onboard audio processing capability.

One or more graphics interface(s) 636 (also commonly referred to as a graphics processing unit (GPU)) provide graphics and video signals between the computer 602 and external display(s) 638 (e.g., LCD, plasma) and/or onboard displays 640 (e.g., for portable computer). The graphics interface(s) 636 can also be manufactured as part of the computer system board.

The computer 602 can operate in a networked environment (e.g., IP-based) using logical connections via a wired/wireless communications subsystem 642 to one or more networks and/or other computers. The other computers can include workstations, servers, routers, personal computers, microprocessor-based entertainment appliances, peer devices or other common network nodes, and typically include many or all of the elements described relative to the computer 602. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 602 connects to the network via a wired/wireless communication subsystem 642 (e.g., a network interface adapter, onboard transceiver subsystem, etc.) to communicate with wired/wireless networks, wired/wireless printers, wired/wireless input devices 644, and so on. The computer 602 can include a modem or other means for establishing communications over the network. In a networked environment, programs and data relative to the computer 602 can be stored in the remote memory/storage device, as is associated with a distributed system. It will be appreciated that the network connections shown are exemplary and other means of establishing a communications link between the computers can be used.

The computer 602 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A computer-implemented method for detecting entrances in images of structural facades, the method comprising:
   capturing images of a facade of a building;
   capturing a LIDAR map of the facade;
   generating a foreground mask for the captured images based on the LIDAR map;
   applying the foreground mask to the captured images to generate masked images;
   extracting one or more entrance candidates from the masked images by detecting vertical edgelets in the masked images using edge detection, a vertical edgelet including an edge pixel and one or more neighboring pixels along a vertical axis; and
   selecting one or more true candidates from the entrance candidate based on known physical constraints of entrances.

2. The computer-implemented method of claim 1, wherein generating a foreground mask for the captured images based on the LiDar map further comprises:
   determining a frontal view of the façade using the LiDar map; and
   generating the foreground mask, the foreground mask masking out portions of the captured images outside the frontal view of the façade.

3. The computer-implemented method of claim 1, wherein generating a foreground mask for the captured images based on the LiDar map further comprises:
   determining a ground line using the LiDar map; and
   generating the foreground mask, the foreground mask masking out portions of the captured images below the ground line.

4. The computer-implemented method of claim 1, wherein extracting one or more entrance candidates from the masked images further comprises:
   separating entrances from non-entrances using a classifier, the classifier performing automatic feature selection and entrance classification to remove non-entrances.

5. The computer-implemented method of claim 4, wherein features used in the classifier include degree of entrance symmetry and entrance color.

6. The computer-implemented method of claim 1, wherein extracting one or more entrance candidates from the masked images further comprises:
   generating a distribution of all detected vertical edgelets;
   extracting a number of top ranked local peaks from the distribution to determine one or more vertical boundaries; and
   determining one or more entrance candidates based on the one or more vertical boundaries.

7. The computer-implemented method of claim 6, further comprising:
   detecting horizontal edgelets in the masked images using edge detection;
   generating a second distribution of all detected horizontal edgelets;
   extracting a number of top ranked local peaks from the second distribution to determine one or more horizontal boundaries; and
   selecting one or more entrance candidates, each entrance candidate having a pair of vertical boundaries within a predefined ratio of length to a horizontal boundary of the one or more horizontal boundaries.

8. The computer-implemented method of claim 1, wherein selecting one or more true candidates from the entrance candidate further comprises:
   projecting the entrance candidates into multi-dimensional space to resolve conflicts based on the known physical constraints using a multi-dimensional reasoning component, the known physical constraints encoded within the a multi-dimensional reasoning component.

9. A system for detecting entrances in images of structural facades, comprising:
   at least one processor configured to execute computer-executable instructions in a computer readable hardware storage memory, the computer-executable instructions, when executed by the processor, cause the processor to:
   capture images of a façade of a building;
   capture a LIDAR map of the façade;
   generate a foreground mask for the captured images based on the LIDAR map;
   apply the foreground mask to the captured images to generate masked images;
   extract one or more entrance candidates from the masked images by detecting vertical edgelets in the masked images using edge detection, a vertical edgelet including an edge pixel and one or more neighboring pixels along a vertical axis; and
   select one or more true candidates from the entrance candidate based on known physical constraints of entrances.

10. The system of claim 9, wherein the computer readable hardware storage memory comprises further computer-executable instructions for the generation of the foreground mask for the captured images based on the LiDar map, that when executed by the processor, cause the processor to:
    determine a frontal view of the façade using the LiDar map; and
    generate the foreground mask, the foreground mask masking out portions of the captured images outside the frontal view of the façade.

11. The system of claim 9, wherein the computer readable hardware storage memory comprises further computer-executable instructions for the generation of the foreground mask for the captured images based on the LiDar map, that when executed by the processor, cause the processor to:
    determine a ground line using the LiDar map; and
    generate the foreground mask, the foreground mask masking out portions of the captured images below the ground line.

12. The system of claim 9, wherein the computer readable hardware storage memory comprises further computer-executable instructions for the extraction of the one or more entrance candidates from the masked images, that when executed by the processor, cause the processor to:
    separate entrances from non-entrances using a classifier, the classifier performing automatic feature selection and entrance classification to remove non-entrances.

13. The system of claim 12, wherein features used in the classifier include degree of entrance symmetry and entrance color.

14. The system of claim 9, wherein the computer readable hardware storage memory comprises further computer-executable instructions for the extraction of the one or more entrance candidates from the masked images, that when executed by the processor, cause the processor to:
    generate a distribution of all detected vertical edgelets;
    extract a number of top ranked local peaks from the distribution to determine one or more vertical boundaries; and
    determine one or more entrance candidates based on the one or more vertical boundaries.

15. The system of claim 14, wherein the computer readable hardware storage memory comprises further computer-executable instructions, that when executed by the processor, cause the processor to:
    detect horizontal edgelets in the masked images using edge detection;
    generate a second distribution of all detected horizontal edgelets;
    extract a number of top ranked local peaks from the second distribution to determine one or more horizontal boundaries; and
    select one or more entrance candidates, each entrance candidate having a pair of vertical boundaries within a predefined ratio of length to a horizontal boundary of the one or more horizontal boundaries.

16. A computer-readable hardware storage medium comprising computer-executable instructions for detecting entrances in images of structural facades that when executed by a processor, cause the processor to:
    capture images of a façade of a building;
    capture a LIDAR map of the façade;
    generate a foreground mask for the captured images based on the LIDAR map;

apply the foreground mask to the captured images to generate masked images;

extract one or more entrance candidates from the masked images by detecting vertical edgelets in the masked images using edge detection, a vertical edgelet including an edge pixel and one or more neighboring pixels along a vertical axis; and select one or more true candidates from the entrance candidate based on known physical constraints of entrances.

17. The computer-readable hardware storage medium of claim 16, comprising further computer-executable instructions for the generation of the foreground mask for the captured images based on the LiDar map, that when executed by the processor, cause the processor to:

determine a frontal view of the façade using the LiDar map; and generate the foreground mask, the foreground mask masking out portions of the captured images outside the frontal view of the façade.

18. The computer-readable hardware storage medium of claim 16, comprising further computer-executable instructions for the generation of the foreground mask for the captured images based on the LiDar map, that when executed by the processor, cause the processor to:

determine a ground line using the LiDar map; and generate the foreground mask, the foreground mask masking out portions of the captured images below the ground line.

19. The computer-readable hardware storage medium of claim 16, comprising further computer-executable instructions for the extraction of the one or more entrance candidates from the masked images, that when executed by the processor, cause the processor to:

separate entrances from non-entrances using a classifier, the classifier performing automatic feature selection and entrance classification to remove non-entrances.

20. The computer-readable hardware storage medium of claim 16, comprising further computer-executable instructions for the extraction of the one or more entrance candidates from the masked images, that when executed by the processor, cause the processor to:

generate a distribution of all detected vertical edgelets;

extract a number of top ranked local peaks from the distribution to determine one or more vertical boundaries; and determine one or more entrance candidates based on the one or more vertical boundaries.

* * * * *